3,772,398
PROCESS FOR PREPARING A MONOALKYL AROMATIC

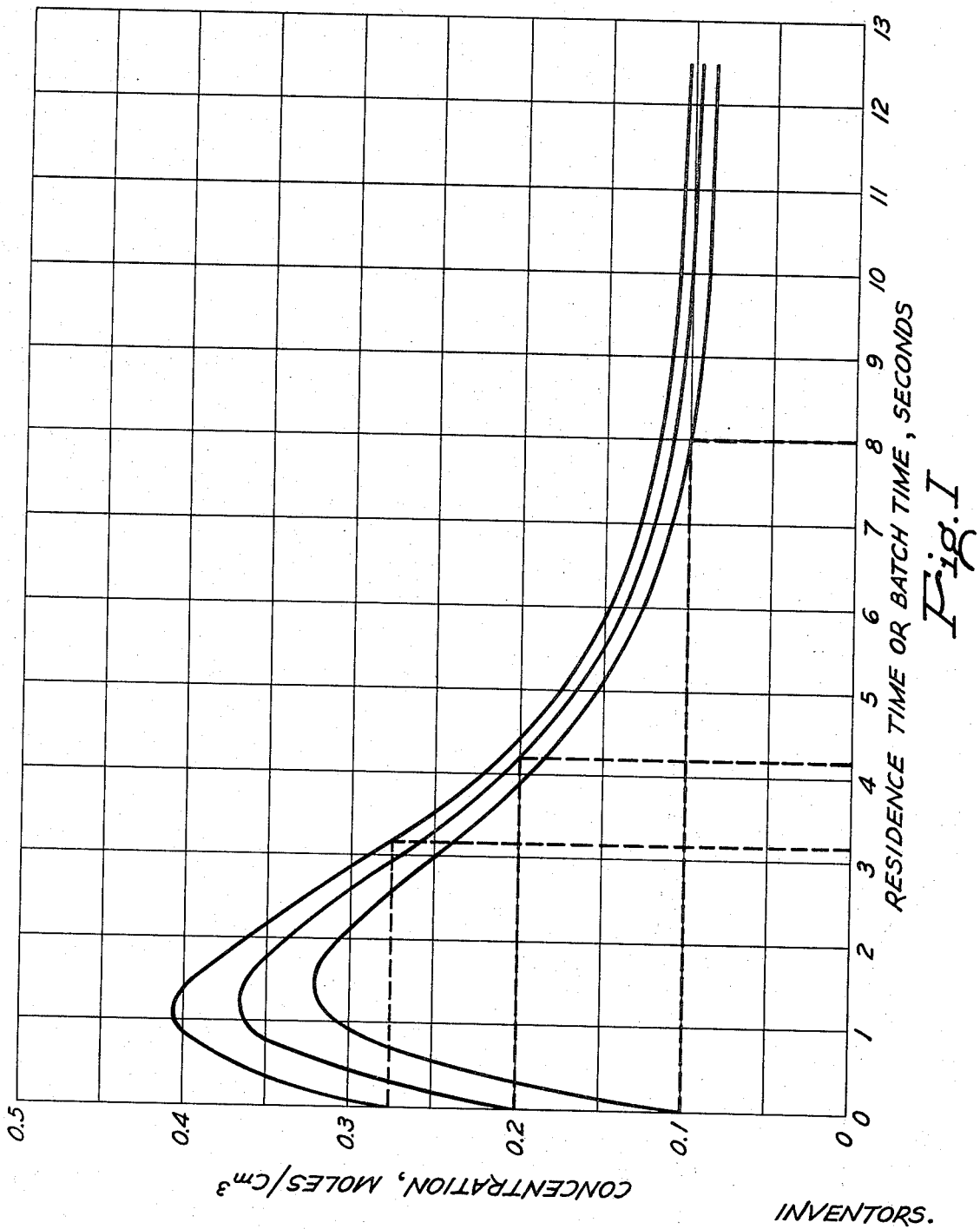
Fig. I

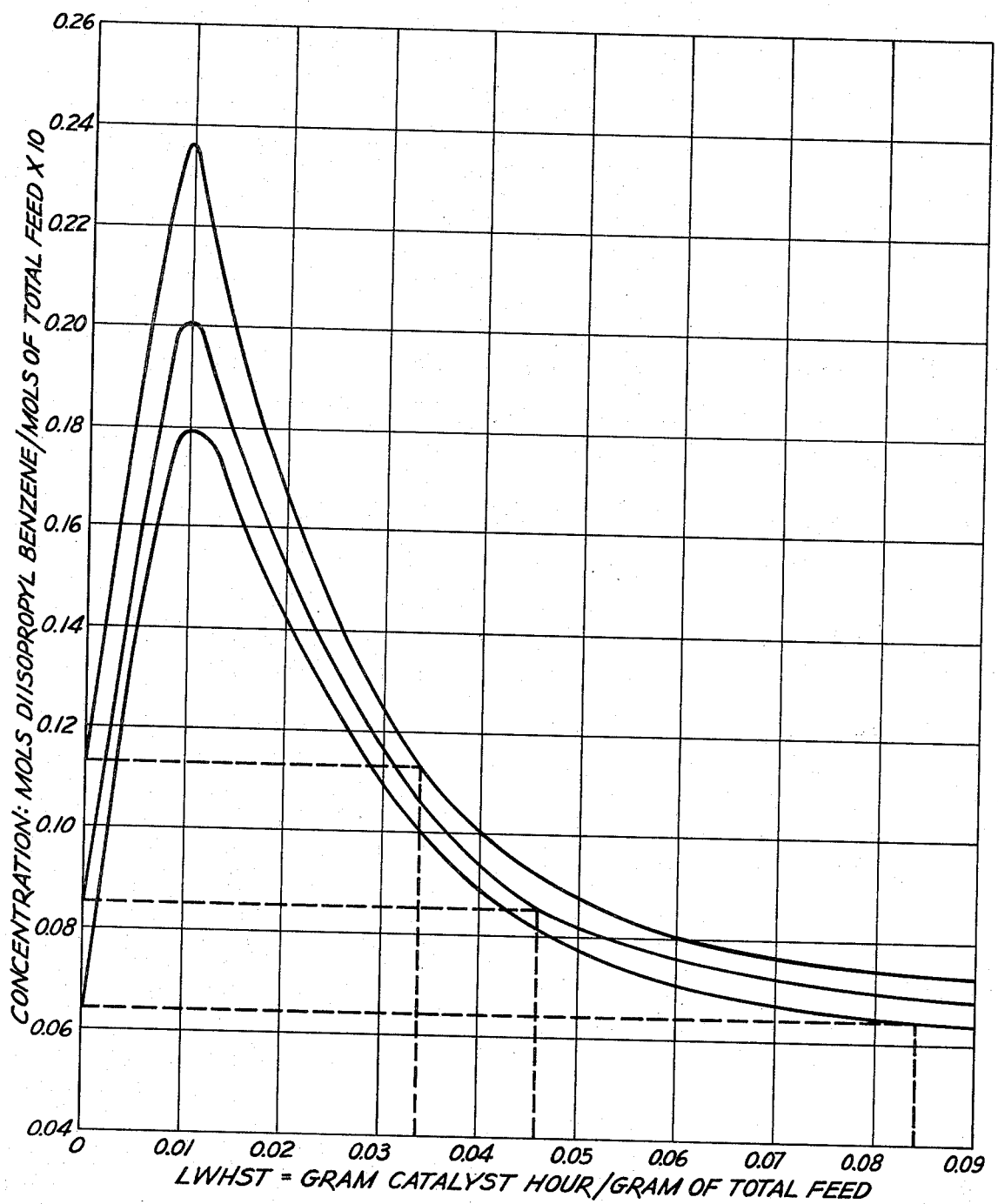
Fig. II

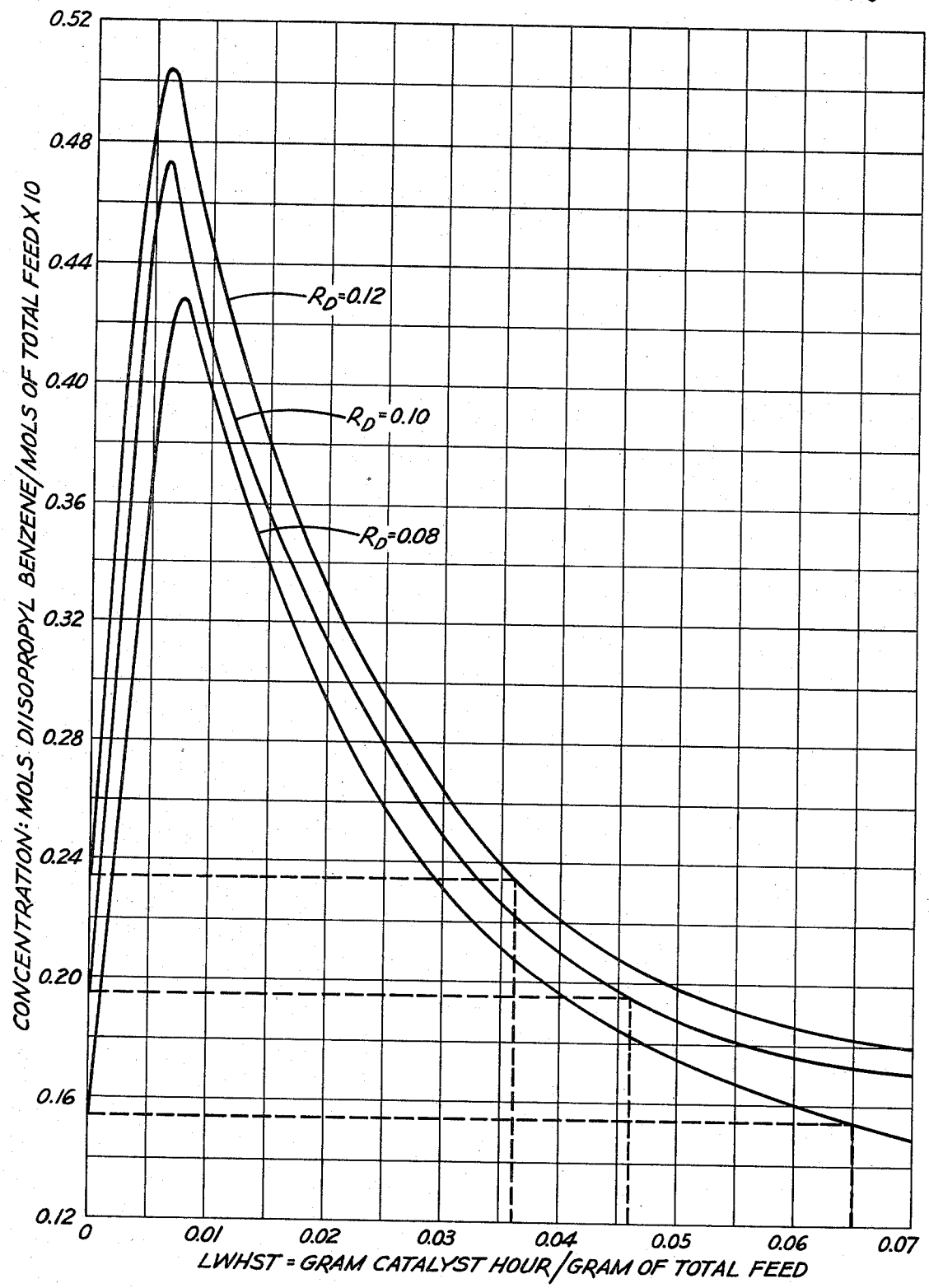
Fig. III

Norman L. Carr, Allison Park, and Daniel Y. C. Ko, Pittsburgh, Pa., assignors to Gulf Research & Development Company, Pittsburgh, Pa.
Filed Aug. 13, 1971, Ser. No. 171,540
Int. Cl. C07c 3/52
U.S. Cl. 260—671 P
12 Claims

ABSTRACT OF THE DISCLOSURE

An improvement in a process wherein a first compound is converted to a second compound in an essentially irreversible reaction or to the second compound and to a third compound in essentially irreversible reactions, the second compound and the third compound are convertible to each other in equilibrium-limited reactions and the third compound is initially present in the reaction zone in an amount greater than the amount that would be present at equilibrium, which involves introducing an additional amount of the third compound in the reaction zone and terminating the process when the reaction mixture contains the third compound in an amount greater than the amount initially present.

---

This invention relates to a process wherein there occurs essentially irreversible and equilibrium-limited reactions, illustrated, for example, by the following general reaction mechanisms:

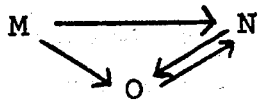

wherein ecah of M, N and O are chemical compounds. In the above reactions, a reaction mixture containing compound M is converted, in any manner, batch or continuous operation, with or without catalyst, to compound N in an essentially irreversible reaction or said compound M is converted to said compound N and to compound O in essentially irreversible reactions. Compounds N and O, on the other hand, are convertible to ecah other in essentially equilibrium-limited reactions. During the course of the reactions the concentration of said compound O reaches an amount in excess of that amount present at equilibrium before the reaction mixture reaches equilibrium.

In our copending application Ser. No. 171,541, entitled, "Improvement in Irreversible and Equilibrium-Limited Reactions," filed concurrently herewith, we have found that in processes, such as defined above, we can minimize the formation of said compound O and, in fact, we can virtually eliminate net production of said compound O in said process, as well as reduce the reaction time and still maintain desired conversions and selectivity to said compound N, by the mere expedient of adding said compound O to the reaction zone in an amount greater than the amount that would be present at equilibrium and terminating the process before the reaction mixture reaches equilibrium, preferably when the amount of said compound O is the reaction product corresponds substantially to the amount of said compound O initially added to the reaction zone.

We further found in our copending application, referred to above, that the improvement was equally valid whether or not two or more reactants were employed resulting in the formation of two or more reaction products, for example, in the reaction of benzene (B) with propylene (P), to produce a reaction product containing desired cumene (C) and undesired diisopropyl benzene (D):

$$B + P \rightarrow C + D$$

$$B + D \rightleftharpoons C$$

We have now found that by introducing into the reaction zone an additional amount of said compound O (or D, for example, in a process such as illustrated immediately above), so that the resulting amount of said compound O is in excess of the amount initially added in our said copending application the residence time required to obtain the same conversion and yield to the desired compound, as in said copending application, is materially reduced, while at the same time production of said compound O is virtually eliminated, as in our said copending application.

The process of this invention can further be illustrated by reference to the following reaction mechanisms:

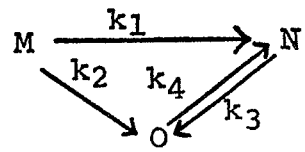

the kinetics of which are postulated as follows: $r_1 = k_1 C_M$, $r_2 = k_2 C_M$, $r_3 = k_3 C_N$ and $r_4 = k_4 C_O$. In the above, $k_1$, $k_2$, $k_3$ and $k_4$ are reaction rate constants, $r_1$, $r_2$, $r_3$ and $r_4$ are reaction rates and $C_M$, $C_N$ and $C_O$ are the concentrations of compounds M, N and O, respectively, and are assumed to have a dimension of mols per cubic centimeter. A differential material balance was set up for each of compounds M, N and O and the resulting differential equations were programmed on an analog computer. The reactions were assumed to take place either in a flow reactor or in a batch reactor. In a flow reactor time is referred to as "residence" time and for a batch reactor the time was considered "actual time" or "batch time." Using the values of $k_1 = 0.0926$, $k_2 = 0.615$, $k_3 = 0.069$ and $k_4 = 0.64$, the concentration profiles of compound O shown in FIG. I were obtained for compound O. In FIG. I concentration in mols of compound O per cubic centimeter of reaction mixture is plotted against residence time or batch time in seconds. Consider the addition of 0.1 mol of compound C as being the amount normally added to the initial reaction mixture, as in our said copending application, necessary to obtain the desired results therein. When the reaction is terminated prior to equilibrium but when the amount of said compound O is equal to the amount initially present in the reaction mixture, a residence time of eight seconds is required. When runs are made wherein 0.2 or 0.3 mol of compound O are added to the initial reaction mixture, however, we obtain concentration profiles for compound O in the reaction product corresponding to the concentration profile obtained when 0.1 mol of said compound O is in the initial reaction mixture. Unexpectedly, we have found that when said reactions are similarly terminated prior to equilibrium and when the amount of said compound O in the reaction product is equal to the total amount (the amount initially present and the additional amount added therein) present at the beginning of the reaction, the residence time required to obtain the same selectivities to desired compound N, as in our said copending application, has been reduced to 4.2 and 3.15 seconds, respectively.

The process of this invention can further be illustrated by the following. Benzene and propylene were passed over a zeolite catalyst, resulting in the production of cumene and diisopropylbenzene. A zeolite catalyst can be defined as a natural or synthetic hydrated metal alumino-silicate consisting basically of an open, three-dimensioned framework of SiO₄ and AlO₄ tetrahedra, having a silica to alumina molar ratio of at least about 3.0, a pore size large enough to permit internal absorption of benzene and not more than 90 percent of their aluminum atoms associated with monovalent cations, for example, sodium or potassium, and the remainder with polyvalent cations, for example, lanthanum, cerium, etc. and/or ammonium or hydrogen. A particularly effective zeolite is zeolite Y such as defined in U.S. Pat. No. 3,130,007. An example of zeolite Y will fall within the following chemical composition:

$$Na^+_{56+y}[(AlO_2)_{56+y}(SiO_2)_{136-y}]$$

wherein $y$ generally has a value of 0, but can vary from $-8$ to $+20$. In the specific reaction herein a Y zeolitic molecular sieve of the following unit cell formula was used.

$$(La^{+++})_{8.8}(NH^+_4)_{21.1}(Na^+)_{8.3}$$
$$[(AlO_2)_{55.7}(SiO_2)_{136.3}] \cdot ZH_2O$$

which had been previously heated to a temperature of about 550° C. for about one hour, with, presumably, the loss of NH₃ and H₂O therefrom. A one-half inch inner diameter, 52-inch long stainless reactor, equipped with a three-inch by 50-inch outer jacket filled with dixylylethane as a heat transfer medium was used. Heat was supplied with a calrod electrical heater and was controlled by a thermoelectric controller. A thermowell extended coaxially through the reactor. The temperature in the reactor was measured by thermocouples evenly spaced through the preheat section, catalyst bed and support section. The pressure was controlled by means of a pressure control valve in the effluent line. Feed to the reactor was pumped upflow by an adjustable stroke proportioning pump from a calibrated feed ank. The reactor was filled with a preheat section of glass beads to a depth of 14 inches. The catalyst section, 13 inches in depth, was composed of 10 grams of the specific 10 to 20 mesh Y type zeolitic molecular sieve catalyst defined immediately hereinabove with two volumes of 8 to 10 mesh quartz per volume of the catalyst. The remaining reactor length was filled with glass beads. The effluent from the reactor was cooled and collected in a gas-liquid separator. The off-gas was measured by a wet test meter, while the liquid product was recovered and weighed. The results obtained are tabulated below in Table I.

computer. Simulation studies were then conducted to determine the rate constant and the associated activation energies so that the kinetic model represented the experimental data. Using the model so obtained simulated reactions were carried out on the computer wherein benzene was reacted with propylene to obtain cumene and diisopropyl benzene. The first reaction was carried out using a benzene to propylene molar ratio of 6:1 and a temperature of 232° C. and the second a molar ratio of 4:1 and a temperature of 232° C. Concentration profiles for diisopropyl benzene for these runs are shown in Figures II and III, respectively, wherein the concentration of diisopropyl benzene in mols per 10 mols of total fluid are plotted against liquid weight hourly space time (LWHST). Note in each case when the amount of diisopropyl benzene in the initial reaction mixture is in excess of the base amount present (0.064 mol in Figure II and 0.155 mol in Figure III) and the reaction is terminated prior to equilibrium but when the amount of diisopropyl benzene in the reaction mixture equals the total amount thereof in the reaction mixture at the inlet of the reactor, the LWHST is drastically reduced. In each case there is virtually no net production of diisopropyl benzene and hence 100 percent selectivity to cumene is achieved.

In a typical reaction exemplifying the type of reaction defined and claimed herein an aromatic compound can be reacted with an olefin to obtain an alkyl aromatic, for example, benzene can be reacted with propylene to obtain cumene as the desired compound and diisopropyl benzene as undesired compound, in a molar ratio of about 1:1 to about 15:1, preferably about 5:1 to about 10:1, at a temperature of about 180° to about 260° C., preferably about 200° to about 235° C., and a pressure of about 350 to about 700 pounds per square inch gauge, preferably about 400 to about 550 pounds per square inch gauge, at a LWHST of about 0.03 to about 1.0, preferably from about 0.04 to about 0.5. The amount of undesired compound that can be present at equilibrium can be from about 0.01 to about 0.15 mol per mol of total final product, generally from about 0.03 to about 0.08 mol. In our said copending application we have stated that the amount of undesired compound added to the initial reaction mixture was in excess of such equilibrium amount, for example, from about 0.1 to about 50, preferably from about one to about 30 percent molar excess. In accordance with the process defined and claimed herein we add

TABLE I

| Run number | 1 | 2 | 3 | 4 | 5 | 6 | 7 | 8 | 9 | 10 | 1 |
|---|---|---|---|---|---|---|---|---|---|---|---|
| Pressure, pounds per square inch gauge | 500 | 500 | 500 | 500 | 500 | 500 | 500 | 500 | 500 | 500 | 500 |
| Temperature, ° C | 232 | 232 | 232 | 214 | 214 | 214 | 214 | 232 | 232 | 232 | 232 |
| Benzene to propylene, molar ratio | 9.96 | 9.96 | 9.96 | 9.96 | 9.96 | 9.96 | 9.96 | 5.905 | 5.905 | 5.905 | 5.905 |
| LWHST [1] | 0.0127 | 0.0498 | 0.1054 | 0.0129 | 0.02525 | 0.0506 | 0.0833 | 0.01262 | 0.0267 | 0.0515 | 0.1 |
| Reactants (mols per 100 grams):[2] | | | | | | | | | | | |
| Benzene | 1.215 | 1.215 | 1.215 | 1.215 | 1.215 | 1.215 | 1.215 | 1.1733 | 1.1733 | 1.1733 | 1.1733 |
| Propylene | 0.122 | 0.122 | 0.122 | 0.122 | 0.122 | 0.122 | 0.122 | 0.1986 | 0.1986 | 0.1996 | 0.1986 |
| Product (mols per 100 grams): | | | | | | | | | | | |
| Benzene | 1.1027 | 1.10 | 1.09 | 1.109 | 1.1065 | 1.1036 | 1.1023 | 1.066 | 0.9956 | 0.9881 | 0.9810 |
| Cumene | 0.1038 | 0.111 | 0.1128 | 0.0999 | 0.1066 | 0.1075 | 0.1107 | 0.1426 | 0.1655 | 0.1770 | 0.1785 |
| Diisopropyl benzene | 0.00813 | 0.00356 | 0.00273 | 0.01133 | 0.00849 | 0.00485 | 0.0310 | 0.02409 | 0.01223 | 0.00810 | 0.0073 |
| Propylene | 0.0 | 0.0 | 0.0 | 0.0 | 0.0 | 0.0 | 0.0 | 0.0 | 0.0 | 0.0 | 0.0 |

[1] Liquid weight hourly space time=gram catalyst hour/grams of total fluid.
[2] Mols/100 grams of total fluid, with total fluid including total reaction mixture.

Based on the above data the following reaction mechanism and kinetics were proposed:

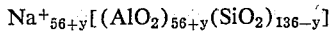

Benzene (B) + Propylene (P) $\xrightarrow{k_1}$ Cumene (C)

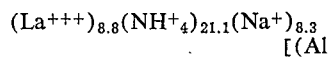

Benezene + 2 Propylene $\xrightarrow{k_2}$ Diisopropyl Benzene (D)

Diisopropyl Benzene + Benezene $\underset{k_4}{\overset{k_3}{\rightleftarrows}}$ 2 Cumene $r_1 = k_1 C_B C_P$, $r_2 = k_2 C_B C_P^2$, $r_3 = k_3 C_D C_B$, and $r_4 = k_4 C_C^2$, wherein $k_1$, $k_2$, $k_3$ and $k_4$ are reaction rate constants, $r_1$, $r_2$, $r_3$ and $r_4$ are reaction rates (gram mols per hour per gram of catalyst) and $C_B$, $C_P$, $C_C$ and $C_D$ are concentrations (gram mols per gram of total fluid). The reaction mechanism and kinetics were mechanized on an analog still an additional amount of undesired compound so that the mol percent thereof present in the initial reaction mixture is from about 0.2 to about 100 percent, preferably from about two to about 60 percent, based on the total reaction mixture. As in our said copending application the process is preferably terminated prior to the time the reaction product reaches equilibrium, most preferably when the amount of undesired compound in the reaction product is equal to the total amount in the reaction mixture at the inlet of the reactor.

The improvement herein has been both broadly and specifically described and defined, but it is apparent that the same is applicable to any process wherein there occurs essentially irreversible and equilibrium-limited reactions, as exemplified by the general reaction mechanisms defined above, for example, alkylation reactions, such as the alkylation of benzene with propylene or ethylene to obtain cumene or ethyl benzene, respectively, as desired compounds and diisopropyl benzene or diethyl benzene, respectively, as undesired compounds, or the alkylation of toluene with propylene to obtain cumene as the desired compound and diisopropyl toluene as the undesired compound, dealkylation reactions, such as the reaction of toluene with hydrogen at elevated temperatures to obtain benzene as the desired compound and diphenyl as the undesired compound, etc.

Obviously, many modifications and variations of the invention, as hereinabove set forth, can be made without departing from the spirit and scope thereof, and therefore only such limitations should be imposed as are indicated in the appended claims.

We claim:

1. In a process wherein an olefin is converted, by reaction with an aromatic hydrocarbon, to a monoalkyl aromatic and to a dialkyl aromatic in essentially irreversible reactions, said monoalkyl aromatic and said dialkyl aromatic are convertible to each other in equilibrium-limited reactions and said dialkyl aromatic is initially present in the reaction zone in an amount greater than the amount that would be present at equilibrium, during the course of said reactions the concentration of said dialkyl aromatic reaches an amount in excess of that amount present at equilibrium before the reaction mixture reaches equilibrium, the improvement which comprises introducing an additional amount of said dialkyl aromatic in the reaction zone and terminating the reaction when the reaction mixture contains said dialkyl aromatic in an amount greater than the amount initially present.

2. The process of claim 1 wherein the amount of said dialkyl aromatic in the reaction product upon termination of the reaction corresponds substantially to the total amount of said dialkyl aromatic present at the beginning of the reaction.

3. The process of claim 2 wherein said dialkyl aromatic in the reaction product is recycled to the reaction zone.

4. The process of claim 1 wherein said olefin is propylene, which is reacted with benzene to obtain cumene, diisopropyl benzene is said dialkyl aromatic and said diisopropyl benzene and cumene are convertible to each other in equilibrium-limited reactions.

5. The process of claim 4 wherein the amount of diisopropyl benzene upon termination of the reaction corresponds substantially to the total amount of diisopropyl benzene present at the inlet of the reactor.

6. The process of claim 5 wherein the diisopropyl benzene in the reaction product is recycled to the reaction zone.

7. The process of claim 1 wherein the total amount of said dialkyl aromatic in said reaction mixture is from about 0.2 to about 100 mol percent that would be present at equilibrium.

8. The process of claim 1 wherein the total amount of said dialkyl aromatic in said reaction mixture is from about two to about 60 mol percent that would be present at equilibrium.

9. The process of claim 4 wherein the total amount of said dialkyl aromatic in said reaction mixture is from about 0.2 to about 100 mol percent that would be present at equilibrium.

10. The process of claim 5 wherein the total amount of said dialkyl aromatic in said reaction mixture is from about two to about 60 mol percent that would be present at equilibrium.

11. The process of claim 4 wherein the reactants are benzene and propylene and are present in a molar ratio of about 1:1 to about 15:1, the reaction temperature is about 180° to about 260° C. and the pressure about 350 to about 700 pounds per square inch gauge.

12. The process of claim 4 wherein the reactants are benzene and propylene and are present in a molar ratio of about 5:1 to about 10:1, the reaction temperature is about 200° to about 235° C. and the pressure about 400 to about 550 pounds per square inch gauge.

References Cited

UNITED STATES PATENTS

| | | | |
|---|---|---|---|
| 2,403,785 | 7/1946 | Britton et al. | 260—671 R |
| 2,818,452 | 12/1957 | Mavity | 260—671 P |
| 2,995,611 | 8/1961 | Linn et al. | 260—671 R |
| 2,883,438 | 4/1959 | Egbert | 260—671 P |
| 2,920,118 | 1/1960 | Landau et al. | 260—671 P |
| 3,274,278 | 9/1966 | Kapur et al. | 260—671 B |
| 3,385,906 | 5/1968 | Kaufman | 260—671 P |

OTHER REFERENCES

Hougen et al.: Chemical Process Principles, Pt. II, 2d Edition, John Wiley & Sons, New York (1954) pp. 1020-1.

CURTIS R. DAVIS, Primary Examiner

U.S. Cl. X.R.

260—671 R, 672 T

PO-1050
(5/69)

UNITED STATES PATENT OFFICE
CERTIFICATE OF CORRECTION

Patent No. 3,772,398    Dated November 13, 1973

Inventor(s) Norman L. Carr and Daniel Y. C. Ko

It is certified that error appears in the above-identified patent and that said Letters Patent are hereby corrected as shown below:

Column 1, line 52, "171,541" should be "171,474".

Column 3, line 35, "ank" should be "tank".

Column 4, last column of Table I, Run No. "1" should be "11".

Column 4, under Run No. 10 of Table I, "0.1996" should be "0.1986".

Signed and sealed this 23rd day of April 1974.

(SEAL)
Attest:

EDWARD M. FLETCHER, JR.
Attesting Officer

C. MARSHALL DANN
Commissioner of Patents